(12) United States Patent
Hamouz et al.

(10) Patent No.: US 10,393,629 B2
(45) Date of Patent: Aug. 27, 2019

(54) FUEL CONSUMPTION ESTIMATION

(71) Applicant: Centrica Connected Home Limited, Windsor, Berkshire (GB)

(72) Inventors: Miroslav Hamouz, Cambridge (GB); Daniel James Palmer, Ipswich (GB); Nicholas James Bailey, Histon (GB); Nicholas Charles Leith, Cambridge (GB)

(73) Assignee: CENTRICA HIVE LIMITED, Windsor, Berkshire (GB)

( * ) Notice: Subject to any disclaimer, the term of this patent is extended or adjusted under 35 U.S.C. 154(b) by 548 days.

(21) Appl. No.: 14/415,554

(22) PCT Filed: Jul. 12, 2013

(86) PCT No.: PCT/GB2013/051848
§ 371 (c)(1),
(2) Date: Jan. 16, 2015

(87) PCT Pub. No.: WO2014/013229
PCT Pub. Date: Jan. 23, 2014

(65) Prior Publication Data
US 2015/0160099 A1    Jun. 11, 2015

Related U.S. Application Data (60) Provisional application No. 61/671,881, filed on Jul. 16, 2012.

(51) Int. Cl.
*G01M 99/00* (2011.01)
*G01K 17/06* (2006.01)

(52) U.S. Cl.
CPC ........... *G01M 99/002* (2013.01); *G01K 17/06* (2013.01)

(58) Field of Classification Search
CPC .......................... G01K 17/06; G01M 99/002
See application file for complete search history.

(56) References Cited

U.S. PATENT DOCUMENTS

| | | | |
|---|---|---|---|
| 4,864,972 A | * | 9/1989 | Batey .................... F22B 35/008 122/448.3 |
| 6,390,027 B1 | | 5/2002 | Lyons et al. |
| 2006/0289623 A1 | | 12/2006 | Oldham et al. |

(Continued)

FOREIGN PATENT DOCUMENTS

| CN | 101520171 A | 9/2009 |
|---|---|---|
| WO | 2011/130670 A2 | 10/2011 |

OTHER PUBLICATIONS

Khoshmanesh et al., Reduction of Fuel Consumption in an Industrial Glass Melting Furnace, 2007, IEEE, pp. 1-4.*

(Continued)

*Primary Examiner* — Mischita L Henson
(74) *Attorney, Agent, or Firm* — Tucker Ellis LLP; Michael G. Craig (57) ABSTRACT

This invention generally relates to a system for estimating fuel consumption of a boiler in a building and to a method of estimating fuel consumption, in particular for estimating gas consumption. A system is disclosed for estimating fuel consumption of a boiler in a building, the system comprising at least boiler operating model configured to perform said estimating on the basis of at least one ON time of the boiler.

24 Claims, 8 Drawing Sheets

* Boiler make and model, type of heating system (tank, radiators, underfloor, etc.), house type and size (56) References Cited

U.S. PATENT DOCUMENTS

| | | |
|---|---|---|
| 2007/0005190 A1 | 1/2007 | Feinleib et al. |
| 2012/0052453 A1 | 3/2012 | Besore et al. |
| 2012/0078593 A1* | 3/2012 | Kubota ................. G06Q 10/04 703/2 |
| 2014/0222366 A1* | 8/2014 | Calder ................ F24D 19/1081 702/130 |

OTHER PUBLICATIONS

European Patent Office, Extended European Search Report for 13740337.4, date of search Mar. 22, 2018, Munich, 136 pages.

\* cited by examiner

FUEL CONSUMPTION ESTIMATION

FIELD OF THE INVENTION

This invention generally relates to a system for estimating fuel consumption of a boiler in a building and to a method of estimating fuel consumption, in particular for estimating gas consumption.

BACKGROUND TO THE INVENTION

Currently, consumption of a fuel such as gas or oil in a boiler may be monitored by means of a fuel flow rate measuring device coupled to a fuel input pipe of the boiler. The inventor of the present application has however now recognised that, as described in the present application, fuel consumption may be achieved indirectly, i.e., without use of such a device which may have drawbacks with regard to, e.g., cost, installation time, safety, etc.

The inventor has further recognised that indirect gas consumption estimation, without a dedicated in-pipe gas flow measuring device, may be particularly beneficial for gas consumption estimation where the gas is supplied under constant pressure (e.g. due to a pressure regulator) and under control of a valve that opens and closes to let the gas flow into the boiler. i.e., there is no "gas pump" to be monitored. Such a valve may be an inaccessible part of a boiler internal control circuit so that it is difficult to monitor a control signal to the valve.

Thus, the inventor has recognised a need for improved fuel consumption estimation systems and methods.

SUMMARY

According to a first aspect of the invention, there is provided a system for estimating fuel consumption of a boiler in a building, the system comprising at least boiler operating model configured to perform said estimating on the basis of at least one ON time of the boiler.

The fuel may for example be oil or, more preferably, gas. Advantageously, the system may be configured to estimate said fuel consumption indirectly, instead of directly measuring the flow in an input fuel pipe, for example without receiving input from a measuring device arranged to measure flow rate of said fuel.

Preferably, the model is further configured to perform said estimating based on at least one temperature of the building, preferably wherein said at least one temperature comprises at least an internal temperature of the building and preferably additionally an external temperature of the building.

The ON time may be indicated to the model as, e.g., a length of time during which the boiler is ON, start and end times of an ON period, substantially real-time signals indicating of such start and end times, and/or by means of preferably periodic indications of whether the boiler is on or not.

The internal temperature(s) may comprise at least one temperature of one or more (preferably respective) room(s) and/or radiator(s). The/each external temperature may be measured by a device attached to an outside wall of, or near to, the building, e.g., domestic house or commercial premises such as an office block.

There may further be provided the system, configured to monitor at least one control signal to the boiler to determine a said ON time, wherein the control signal is for switching water heating and/or space heating on and off. The signal may for example be a signal directly to a condensing or combination boiler, or may be a control signal to turn an overall heating system comprising the boiler (or furnace/air heater in an embodiment comprising a furnace or air heater instead of a boiler) on and off. Such an ON time may comprise a continuous ON time of the boiler or a sum of subsidiary ON times during a longer period during which the boiler is being pulsed on.

There may further be provided the system, wherein a first said control signal is to activate water heating and a second said control signal is to activate space heating, the system configured to monitor the first control signal to determine a said ON time and to monitor the second control signal to determine a said ON time, the system comprising a first said boiler operating model for water heating and second said boiler operating model for space heating, the system configured to apply the first and second models to thereby perform at least one said fuel consumption estimation.

There may further be provided the system, wherein the boiler is a gas boiler and at least one said control signal is for controlling a gas flow valve on and off.

Figure 9:
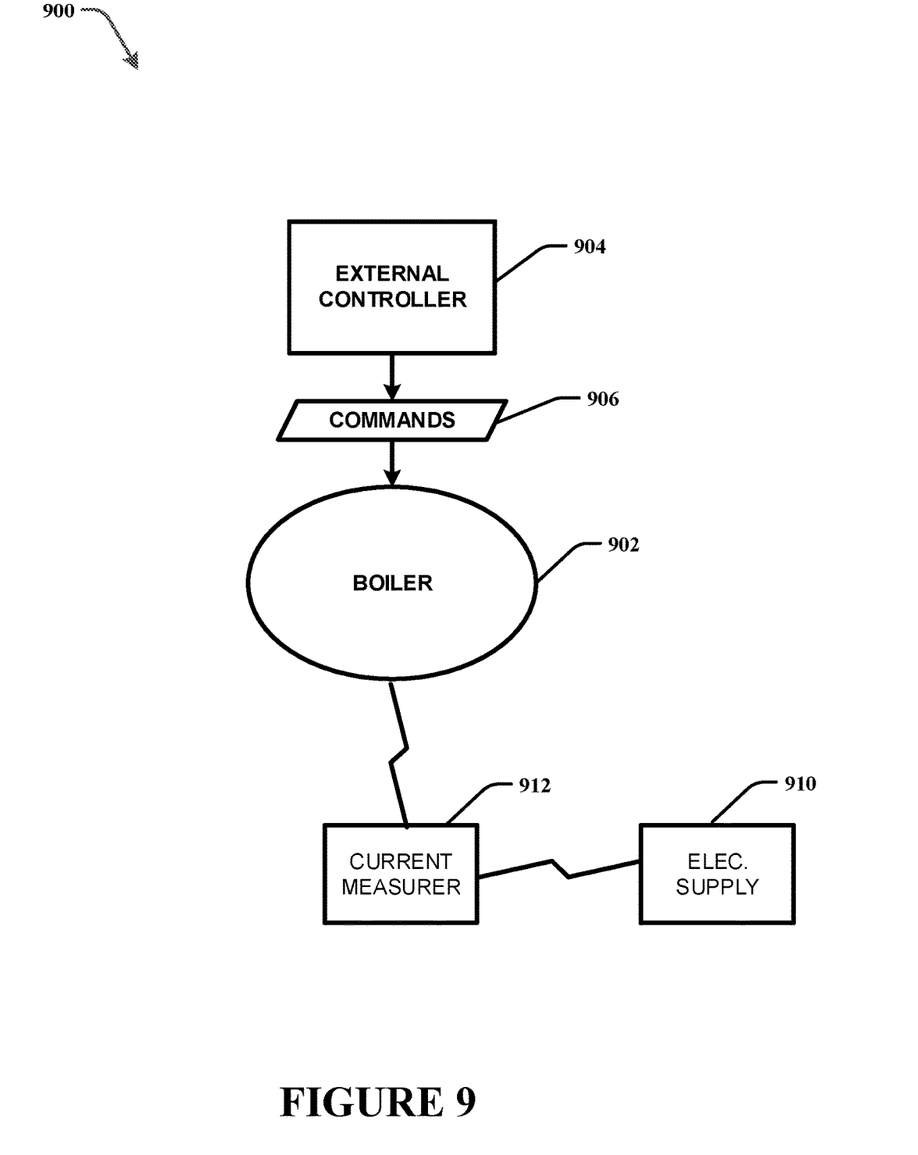
FIG. 9 is a component diagram illustrating an example implementation of one or more portions of one or more systems described herein.

As illustrated in FIG. 9, there may yet further be provided the system 900, comprising a current measuring device 912 such as a smartplug or a permanently installed such device coupled between the boiler 902 and an electricity supply 910 for monitoring electricity usage of the boiler 902, the system 900 configured to determine a said ON time on the basis of said electricity usage monitoring by the current measuring device 912.

There may further be provided the system, wherein a said boiler operating model comprises a mapping function to map at least a said ON time to an estimated fuel consumption, to thereby perform said estimating.

The boiler may be a combination boiler, the system comprising at least one temperature sensor on a water inflow pipe and/or hot water outflow pipe of the boiler, the system configured to detect temperature change on the basis of at least one sensed output of the at least one temperature sensor to thereby provide a said ON time, preferably wherein the water inflow pipe and/or water outflow pipe is associated with domestic water heating rather than for example being pipe(s) connected to the radiator circuit.

Preferably, the boiler operating model is operable to perform said estimating on the basis of, any one or more of:
- a time series of On/Off commands to the boiler for controlling heating of water for a central heating system;
- a time series of On/Off commands to the boiler for controlling heating of water for supplying hot water to taps;
- a time series of indications of boiler electricity consumption;
- a time series of at least one room temperature;
- a time series of at least one external temperature;
- an indication of the type of the boiler, e.g., maximum power, condensing/non-condensing, make and/or model;
- at least one heating system characteristic, e.g., number and/or power rating of radiators and/or presence of a thermostatic valve on each radiator;
- at least one temperature on an output pipe of the boiler;
- an indication of (preferably total) electricity consumption of the boiler.

The central heating system may be a domestic central heating (DCH) system. The supply of hot water to taps may be achieved using a domestic hot water (DHW) system.

According to a second aspect of the invention, there is provided a method of estimating fuel consumption in a building, the method comprising performing said estimation on the basis of at least one ON time of a control signal to a boiler, the control signal to switch the boiler on and off.

Preferably, the method comprises performing said estimating based on at least one temperature of the building, wherein preferably said at least one temperature comprises an internal temperature of the building and additionally may comprise an external temperature of the building.

There may further be provided the method, comprising monitoring at least one said control signal to the boiler to determine a said ON time, wherein at least one said control signal is for switching water heating and/or space heating on and off.

There may further be provided the method, comprising determining a type of fuel consuming activity based an on duration of a said control signal, preferably wherein said type is water heating or space heating.

There may further be provided the method, comprising using a model to determine the estimated fuel consumption, preferably wherein a function of the model is determined on the basis of boiler specification data such as boiler make, boiler model, boiler type such as condensing or combination, boiler maximum power, and/or boiler valve aperture.

There may still further be provided the method, comprising performing the fuel consumption estimating based on a duration of at least one time interval between instances of the boiler being on, wherein the boiler is off in the or each said time interval.

The method may comprise performing said estimation on the basis of any one or more of:
- a time series of On/Off commands to the boiler for controlling heating of water for a central heating system;
- a time series of On/Off commands to the boiler for controlling heating of water for supplying hot water to taps;
- a time series of indications of boiler electricity consumption;
- a time series of at least one room temperature;
- a time series of at least one external temperature;
- an indication of the type of the boiler, e.g., maximum power, condensing/non-condensing, make and/or model;
- at least one heating system characteristic, e.g., number and/or power rating of radiators and/or presence of a thermostatic valve on each radiator;
- at least one temperature on an output pipe of the boiler;
- an indication electricity consumption of the boiler.

Similarly as for the system aspect, the fuel may be gas or oil, and the method may estimate the fuel consumption indirectly without receiving input from a measuring device arranged to measure flow rate of said fuel.

There may further be provided the method, comprising measuring fuel consumption and estimating efficiency of the boiler based on the measured fuel consumption and the estimated fuel consumption.

The method may combine a result of said fuel consumption estimation with an estimate of consumption of said fuel for cooking, preferably to estimate a total fuel consumption of said building.

The method may comprise disaggregation of the estimated gas consumption into component contributions, the disaggregation preferably determining water heating fuel consumption and/or cooking fuel consumption by subtracting a space heating contribution from an estimated total consumption, and/or determining water heating fuel consumption and/or space heating fuel consumption based on measurements of internal temperature of the building during the duration of the estimated gas consumption.

According to a third aspect of the present invention, there is provided a system for estimating fuel consumption of a furnace in a building, the system comprising at least one furnace operating model configured to perform said estimating on the basis of at least one ON time of a fan of the furnace.

There may further be provided the system, configured to monitor at least one control signal to the furnace to determine a said ON time, wherein the control signal is for switching water heating and/or space heating on and off.

Any one or more of the optional features described above for the first or second aspects may be applied correspondingly to the third aspect, wherein reference to the recited boiler is replaced by reference to a furnace. Thus, rather than applying the technique to a boiler, which may be for water- and/or steam-heating, e.g., a condensing or combination boiler as commonly found in British houses, the technique may be applied for hot air heating as commonly found in the USA. For the case of a furnace, the ON time may in an embodiment more specifically be regarded as the ON time of a fan of the furnace.

It is further noted that in any implementation of a system according to any of the above aspects, the ON time may be the ON time of the system as such, rather than specifically of the boiler or furnace.

Preferred embodiments are defined in the appended dependent claims.

Any one or more of the above aspects and/or any one or more of the above optional features of the preferred embodiments may be combined, in any permutation.

BRIEF DESCRIPTION OF THE DRAWINGS

For a better understanding of the invention and to show how the same may be carried into effect, reference will now be made, by way of example, to the accompanying drawings, in which:

FIG. 2 shows an example of the boiler operation model's implementation to predict consumption from boiler ON-time duration and boiler/house characteristics (top left graph 24 shows gas consumption versus time of real operating behaviour; middle left graph 26 shows gas consumption versus ON time of real operating behaviour; bottom left graph 28 has an upper dimension indicating Tpeak (15-30 mins), a lower dimension indicating 'ON time—Tpeak' and a dimension on the vertical axis indicating 'α boiler spec'; the lower middle graph 30 of FIG. 2 shows a frequency analysis as frequency versus boiler power, the graph having a low peak and a higher peak; the lower right-hand graph 32 shows a boiler operation model and has left- and right-hand dimensions corresponding to 'α high peak' and 'α lower peak' respectively and upper and lower dimensions corresponding to 'αTin' and 'αTin–Tex' respectively);

DETAILED DESCRIPTION OF PREFERRED EMBODIMENTS

An embodiment provides a method of estimating domestic gas consumption (e.g., kWh/m^3), using gas boiler control signal (Hot Water and/or Space Heating On/Off), internal and external temperatures and/or "boiler operation model". Such an embodiment may for example effectively enable to a substitute gas (smart)meter (a smart meter, which may be for, e.g., oil, gas, electricity or water, may record measurements of consumption at regular intervals, e.g., 1 hour or less and preferably communicate the data to a central system for processing for the purposes of monitoring and/or billing) and get the total domestic gas consumption/bill indirectly only from boiler control signal and temperatures—all preferably without the actual measurements of the gas flow, which is expensive.

The embodiment may be combined with a remote heating controller which logs, e.g., every 2 minutes, a boiler control signal (i.e. if boiler was firing or not) and/or internal temperature but does not measure the gas flow/consumption.

The embodiment comprises a "boiler operation model" which may be considered a reverse-engineered boiler control model, which—given boiler specs (e.g., make and/or model, either of which may allow for example aperture of a gas valve to be determined), boiler control signal (HotWater/SpaceHeating On/Off) and/or internal & external temperatures (and possibly the output pipe temperature if available) gives an estimated gas flow/consumption of the boiler in a given period of time. This, if combined with some prior statistical knowledge of cooking consumption, may allow to produce, for example, monthly gas kWh consumed by the household for majority of UK households (which typically have only a gas boiler+gas oven/hob).

An advantage of an embodiment is to allow, in particular, gas consumption estimation indirectly, i.e., without a dedicated in-pipe gas flow measuring device. The advantage is particularly appreciated with regard to a gas boiler which, for example in contrast to oil, uses a valve which opens and closes under a constant gas pressure in the pipe, i.e., there is no "gas pump".

An embodiment that is suitable for estimating domestic gas consumption using boiler control signal (Domestic Central Heating and Domestic Hot Water 'ON' time), internal and external temperatures and/or boiler and heating system specifications 10 preferably comprises a model of boiler operation 20 which will predict the gas consumption of a gas boiler based solely on the ON-time 12 of the boiler, more preferably using internal 14 and/or external 16 temperatures as further described herein. Generally, gas consumption is presently only measured by either a gas meter (smart or otherwise) or the costly implementation of a flow meter cut into the piping. Using the boiler operation model in FIG. 1, prediction of gas consumption 22 estimated by means of the boiler's operating ON-time 12 may provide a more rapid and/or cost effective alternative where smart meters are not present and/or where no communication to the smart meter is available. Where smart meters do exist, the boiler operation model may allow the actual gas consumption to be used to estimate the efficiency of the boiler.

Figure 1:
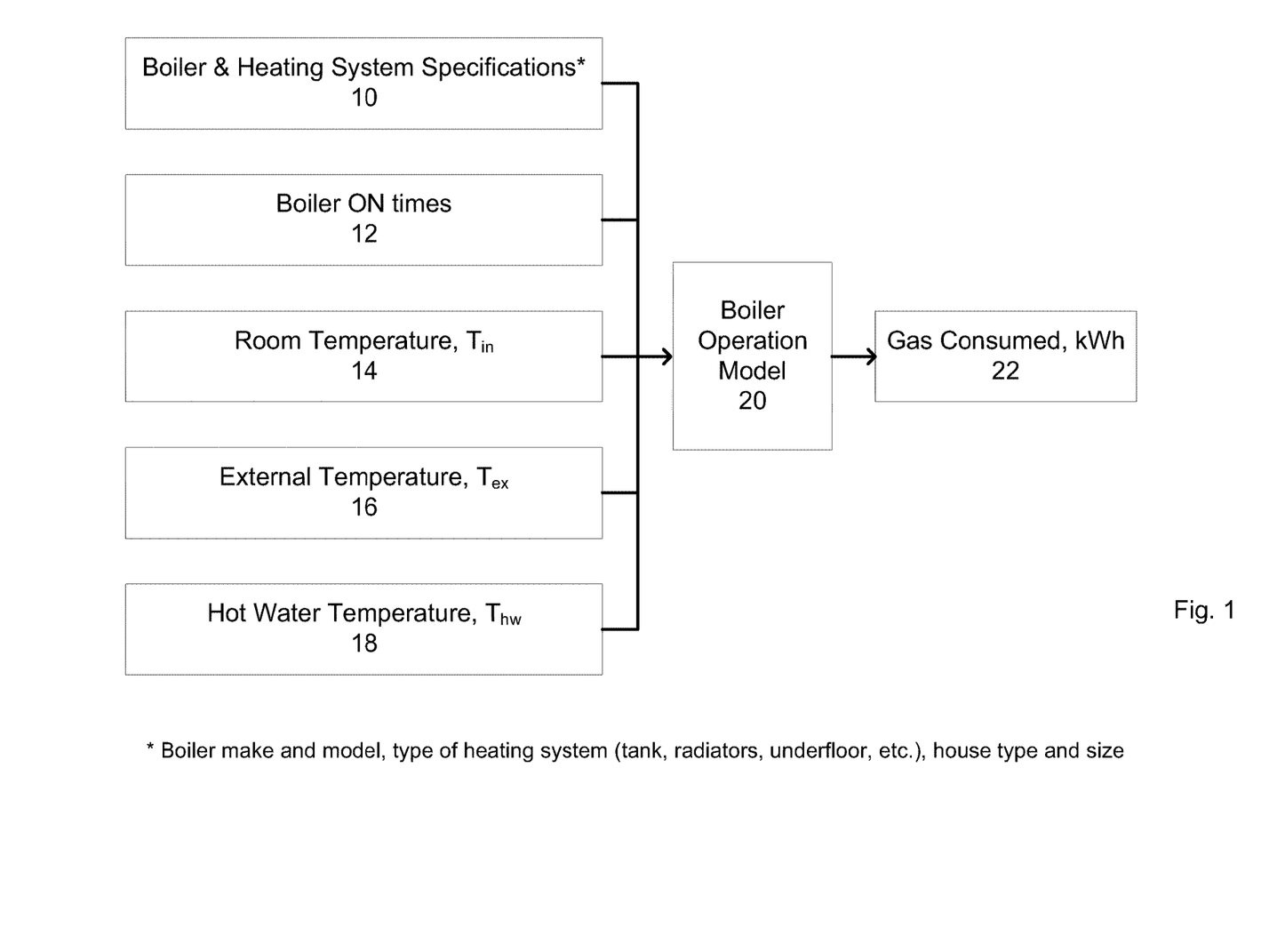
FIG. 1 shows a block diagram of a boiler operation model having the inputs to be used to deduce gas consumption (The inputs including boiler and heating system specifications, boiler ON times, room temperature Tin, external temperature Tex, hot water temperature Thw, and the output indicating gas consumed in kWh; the reference to boiler and heating system specifications corresponding to, e.g., boiler make and/or model, type of heating system (tank, radiators and/or under floor, etc.), and/or house type and/or size)

(Regarding the above external temperature(s), it is noted that—depending on how well insulated the house is—such temperatures may influence the internal temperature(s) and thus the estimation of gas consumption is based on temperature(s) 14 and boiler operating time 12. For a condensing boiler, an external temperature 16 may influence the efficiency of the boiler which may operate based on condensation for releasing heat).

Advantageously, a model 20 of the operating characteristics of a boiler is used. This model may account for the different operating characteristics of a boiler when generating domestic hot water (DHW) and heating water for domestic central heating (DCH). As illustrated in FIG. 9, where possible an external heating control unit 904 will provide the ON commands 906 to the boiler 902. This may log the on times at, e.g., a two minute resolution. This information will be available to the analysis. Given a standard (or 'system') boiler 902, the controller 904 will control both DCH and DHW commands 906. These logged independently for analysis. In the case of a combination (combi) boiler 902, the controller 904 may only be able to log DCH ON command 906, as DHW may be performed automatically on-demand by the boiler 902. In this case the application of a temperature sensor on the DHW outflow pipe of the boiler 902 is desirable to provide the timing calculation.

With regard to a domestic hot water pipe temperature sensor to be used in such an embodiment, attaching a temperature sensor to the DHW pipe of a combi may allow to monitor the output of the boiler, $T_{hw}$ 18. In an example use, the temperature sensor will record a rapid rise in temperature as the boiler operates in DHW ON mode. The rise will be exponential reaching the boilers max output temperature rapidly. The high temperature will be maintained while the boiler is firing. Shortly after the boiler switches off, the temperature will be seen to fall. This drop will be exponential, but at a lower rate. The rate will depend on if the hot water flow is continued at a rate below the boilers minimum flow rate threshold, with quicker cooling recorded if this happens. Taking the time from the start of temperature rise to the start of temperature fall may accurately provide the DHW ON time. In the event that the pipes are in close proximity, a rise in temperature may be noted when the boiler is operated in DCH mode. Therefore the rate of temperature rise generally should exceed some threshold for the rise to be recorded as DHW.

Regarding DHW Operating Characteristics, in one implementation the boiler characteristics for the generation of DHW will be modelled as a sustained period of high power gas consumption. In such an embodiment, the boiler may be assumed to operate at close to its peak power specification. This may depend on the boiler make and model, and therefore this knowledge is a preferable. If this information is not available, the operating model may assume a boiler with default characteristics and the error may be greater. The mathematical model may assume constant gas consumption during the entire DHW ON time. Multiplication of operating power and ON period provides the gas consumption for the DHW operation in an embodiment. Summing over each ON-time recorded provides the total consumption over a period.

Figure 2:
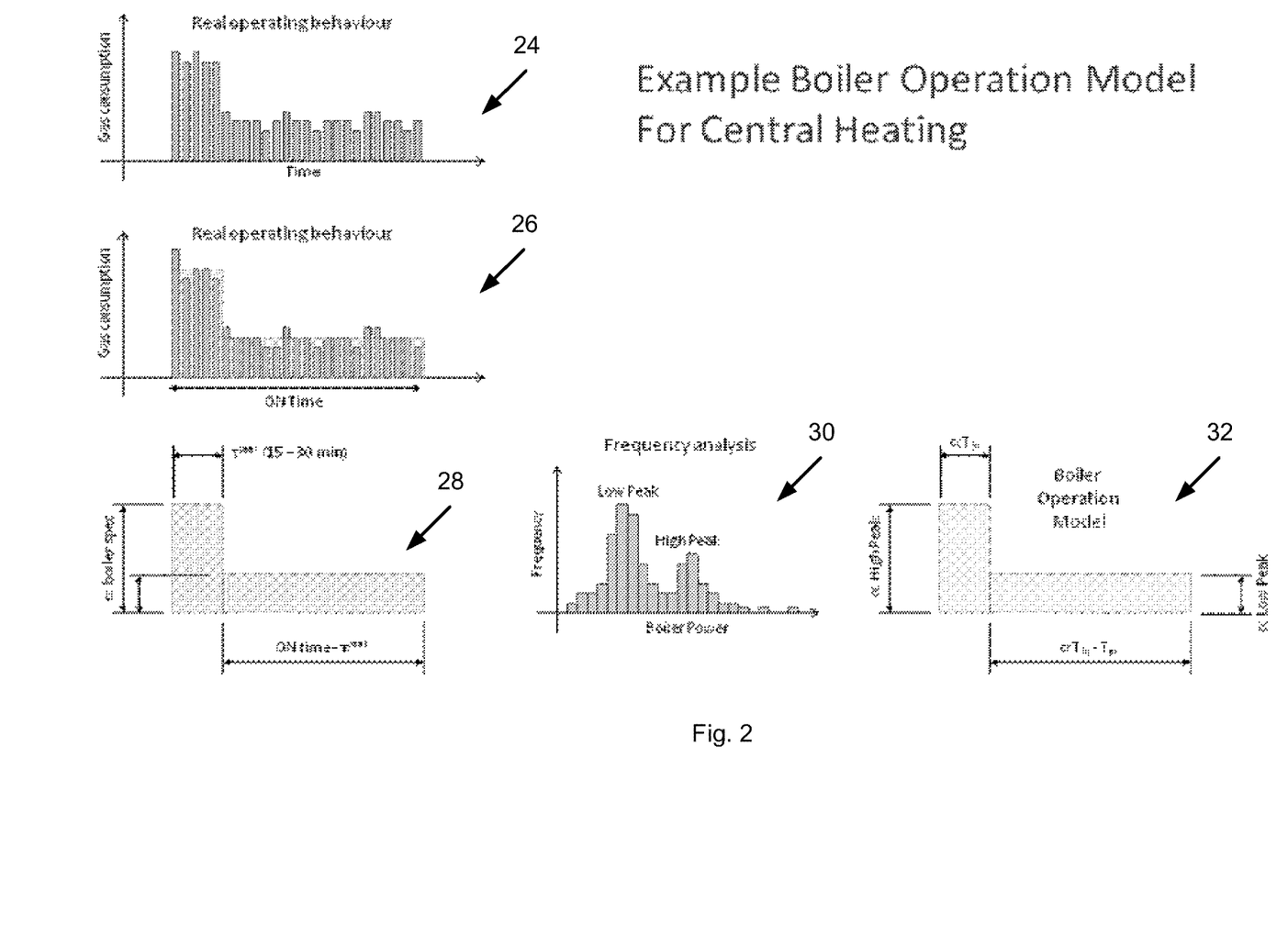

Regarding DCH Operating Characteristics, the operating characteristics of a boiler in DCH mode are generally quite distinct from DHW. DCH operations are typically much longer than DHW ON times. This length therefore may help to identify DCH operations as such. One example of a boiler operation model is shown in FIG. 2 as a two phase model. In one such an example, the first phase will account for the first 15 to 30 minutes of operation and describes the period in which the radiator circuit is heating from cold. This will be a high power phase, similar in magnitude to the DHW output. The operating power will be associated with the boiler specification. The operating power will also be a factor of the starting temperature of the radiator circuit fluid (i.e. room temperature). The output-input temperature differential of the boiler will be maintained relatively constant to improve efficiency. Therefore a warmer room may result in a warmer starting temperature of the radiator circuit, requiring less energy to reach the output temperature. It may be assumed that the boiler is not able to modulate its maximum power output and therefore the effect of a higher room temperature (recorded by the controller unit) may be in a shorter peak power period. When the return temperature has risen sufficiently in this example, the boiler may modulate its output to maintain a fixed temperature difference between the out-flow and return temperatures. This constant $\Delta T$ is preferably designed to maximise efficiency.

Regarding factors affecting the gas consumption signal, up to four factors may influence the gas consumption of the boiler—boiler size, radiator efficiency (and sizing), thermal capacity of the building and/or thermal loss rate of the building. If the boiler is underpowered (with respect to the radiator volume) the consumption signal may be higher than normal as the boiler operates closer to its maximum power (and therefore lower efficiency). If the boiler is overpowered then the initial peak power phase may be short as the radiator volume is heated quickly. The modulated power second phase may have a lower than expected average power which might include periods of zero consumption. This may be caused by the return temperature exceeding the boiler's internal setting threshold which then shuts off the heat exchanger to prevent overheating. A building with a large thermal capacity will exhibit a slow response to the heating supplied by the boiler. This may result in a longer than expected second phase, as the house infrastructure absorbs heat energy reducing the rate of room temperature rise and thus increasing the time taken to reach the setpoint temperature. The consequence of this is it may cool slowly and therefore lead to longer periods between boiler operations. Conversely a house with a low thermal capacity may quickly heat up, resulting in a shorter than expected second phase. However, it may also cool quickly and could result in more frequent boiler operations to maintain the setpoint target temperature.

Regarding use of temperature data channels, an embodiment makes use of house temperature data provided by a heating control unit—preferably including room thermostats—, for example an intelligent and/or remote heating controller. In one example, one internal ($T_{in}$) and one external temperature ($T_{ex}$) measurement devices may record temperature readings to be logged with the ON time data. Referencing the internal temperature with the time at which the boiler ends a DCH ON operation will indicate the target setpoint the thermostat is set to in this example if this information is not already known. The temperature at which the boiler operation starts will influence the length of the boiler operation as the temperature in the radiator circuit will be approximately room temperature. For a standard system boiler, the room temperature may slightly influence the energy required to heat the hot water tank as the tank will be housed somewhere in the building and its loss rate will be related to the temperature difference between the tank internal temperature and room temperature. Furthermore, standard system boilers generally feed the DHW system from a hot water tank in the loft. The temperature of this feed water may be influenced by $T_{in}$ and $T_{ex}$ so the higher the ambient temperature, the lower the $\Delta T$ required. Whereas for a combi boiler, the DHW water is fed directly from the mains and may therefore maintain a relatively constant underground temperature of 12-14° C. regardless of $T_{ex}$. These variable factors may affect the gas consumption pattern of each boiler operation and are preferably taken into account in order to maximise the accuracy of the estimated gas consumption. The model of boiler operation is reactive to the various temperature sensor data and will continually adjust the model characteristics.

Regarding cooking and other gas consumption, the total gas consumption for a household typically includes a contribution from various other gas consuming devices, the most wide spread will be gas cooking hob, oven or both. A model of these other gas consumption is possible based on human behaviour. However, generally more accurately, the gas consumption from cooking may be determined from the total consumption in a summer period minus the DHW contribution. This cooking contribution may be assumed consistent throughout the year, with cooking behaviour not changing drastically with the seasons. Other contribution from small gas fire places could be accounted for by a basic steady gas rate consumption model.

Advantages, any one or more of which may be present or absent in any embodiment such as those described above (which may have any of the features described above in any combination), are described briefly below:

a model of boiler operation based on observed gas consumption signals;

ability to estimate gas consumption volume without directly measuring gas flow;

ability to provide accurate gas consumption data without the need for a smart meter;

given smart meter data, the ability to estimate the efficiency of the boiler;

given smart meter data, the ability to estimate DHW and cooking contribution by subtraction of the DCH contribution from the total metered;

differentiate between various gas consuming appliances and boiler operating modes;

given smart meter readings and temperature data, thermal loss rate can be calculated by using the boiler operation model to calculate the DCH energy input; and disaggregation of the total gas consumption into component contributions.

Regarding the actual model—the schema with the boiler power is just an example of such a model. Mathematically, a model may be described as a mapping (function) where the inputs are any one or more of the following:

time series of Boolean DCH and/or DHW On/Off commands;

high resolution (e.g., every 2 mins) indication of boiler electricity consumption—this may give more information than just "Boiler On/Off" and/or enable more accurate estimate of gas/oil consumption at the cost of additional hardware such as a Smartplug, e.g., a Smartplug coupled between the boiler and electricity supply for monitoring electricity usage of the boiler, preferably providing data substantially in real-time;

time series of room temperatures;

time series of external temperatures;

boiler specs (e.g., max power, condensing/non-condensing, make and/or model)

heating system characteristics (e.g., number and power rating of radiators (this may for example indicate the thermal mass to be heated), and/or thermostatic valves yes/no); and temperature on the output pipe for a combi boiler (where control signal for DHW is not available).

An output of the model is preferably the estimated kWh spent on DCH and/or DHW in the given time period. If there is, e.g., smartmeter and algorithm has an access to the readings—then such estimation of DCH and/or DHW kWh will be even more accurate as one can correlate the model and actual gas consumption this may provide the above advantage of disaggregation. Additionally or alternatively, efficiency of the boiler may be computed by estimating the output power/input power ratio.

One, albeit potentially less efficient, realization of such a boiler model comprises a large lookup table with each make, model, combination of external and/or internal temperatures and/or On-time duration. An example of such a table is shown in Table 1, which shows the modeled gas consumption for a particular boiler type/model. For example, for each combination of the input for a given make and model, an Input Gas Power may be prerecorded in such table. This table can be created in a lab environment. Then for each contiguous DCH On period (that may be easily decodable from the time series of Boolean DCH On/Off commands) an average boiler input power (e.g. 5-30 kW) may be looked up from the table. The total kWhs consumed by the boiler in the given period would then be an integral/sum of OnTimeDuration*InputPower for each contiguous DCH On period.

TABLE 1

| Heating pulse duration [min] | Modelled gas consumption [kWh] | Average power [kW] |
|---|---|---|
| 2 | 0.1 | 3.5 |
| 4 | 0.4 | 6.6 |
| 6 | 0.8 | 7.9 |
| 8 | 1.5 | 11.3 |
| 10 | 2.5 | 15.0 |
| 12 | 4.0 | 19.8 |
| 14 | 3.4 | 14.6 |
| 16 | 2.8 | 10.7 |
| 18 | 4.1 | 13.6 |
| 20 | 5.5 | 16.6 |
| 22 | 4.1 | 11.2 |
| 24 | 4.6 | 11.5 |
| 26 | 5.1 | 11.8 |
| 28 | 5.6 | 12.0 |
| 30 | 6.1 | 12.3 |
| 32 | 6.7 | 12.5 |
| 34 | 7.2 | 12.8 |
| 36 | 7.8 | 13.0 |
| 38 | 8.3 | 13.1 |
| 40 | 8.2 | 12.3 |
| 42 | 8.1 | 11.5 |
| 44 | 7.9 | 10.8 |
| 46 | 7.8 | 10.2 |
| 48 | 7.7 | 9.6 |

Figure 3:
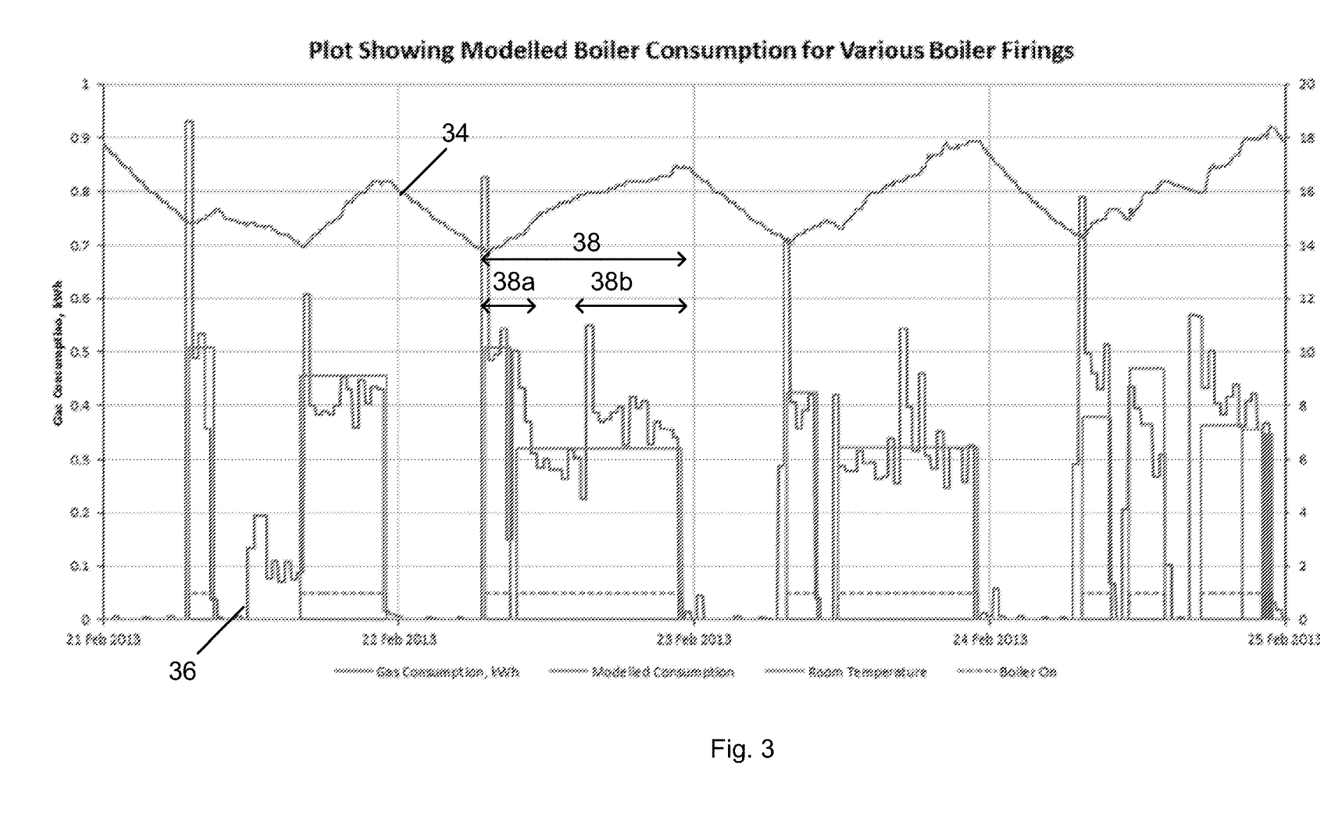
FIG. 3 shows another example of the boiler operation model's implementation to predict consumption from boiler ON-time duration and boiler/house characteristics.

Another example of modeled boiler consumption for DCH is illustrated in FIG. 3. The model consists of a learned mapping between the heating pulse duration [min] of the boiler and the corresponding energy consumption [kWh] of the pulse. The parameters of the model were obtained by analysing boiler firings of a domestic boiler. An extract of data collected for a particular boiler make/model are shown in Table 1. The data was collected by measuring boiler firing durations and energy consumer during two months of the heating season 2012-2013 (i.e. during months when central heating is required to heat the home). The model (which is described in more detail below) is based on a learned mapping based on the actual gas kWh consumption used for heating pulses of varying duration. The model was then used to estimate the gas consumption for the remainder of the heating season. FIG. 3 shows the model applied to a particular time period in the heating season (during which boiler firing durations continued to be collected), as well as the actual gas consumed during that period. As shown in FIG. 3, the model closely follows the gas consumption within this period, and the error in the modelled boiler consumption with respect to the actual gas consumption is 3%. This level of accuracy is generally satisfactory for disaggregation of DCH gas consumption from the total gas consumption.

FIG. 3 also shows the room temperature 34 collected over the period. Such room temperature data 34 can be used to disaggregate the overall gas consumption into that attributable to DCH and that attributable to domestic hot water (DHW) alone. For example, actual gas consumption 36 does not correspond to an increase in the room temperature 34, and thus, it can be assumed that the boiler was fired for DHW only. By comparing the room temperature (more particularly, changes in room temperature over a particular time interval) with the gas consumed in that time interval, it is possible to provide a user with useful information on how they use their gas supply.

The modelled gas consumption shown in FIG. 3 largely ignores boiler firing modulation. For example, the boiler firings 38 were modelled using the total time the boiler was 'on', and ignoring the fact that the gas consumed by the boiler during a first firing period 38a was high (possibly in order to heat the house after a long period of not being heated), but the gas consumed in the subsequent firings (e.g. 38b) was lower (as it may have required less energy to maintain the house at the desired temperature). Consequently, the modelled consumption does not necessarily accurately represent the gas consumed in this particular period. Thus, an optional improvement to the model could be to account for boiler firing modulation, and preferably at a minimum, boiler firings such as 38 would be split into at least two firing periods 38a and 38b. Doing so may reduce the error in the boiler consumption model further.

Additionally or alternatively, the model could be improved by considering the time between boiler firings. For example, if a user has set a boiler to turn on for DCH and heat the house to 21° C. between 06:00 and 08:00 in the morning, after an initial long firing pulse to bring the temperature up to 21° C., the boiler will generally fire periodically in response to the heating system/boiler checking that the temperature is still 21° C. The time between these 'checks' may vary, and may depend on how well insulated the building is. For instance, if a 'check' pulse fired shortly after the long initial pulse indicates that the temperature has already dropped below 21° C., then the system will need to a) bring the temperature back up to 21° C. and b) fire 'check' pulses more frequently to ensure the temperature is maintained at 21° C. In a better-insulated building which retains the heat, longer gaps between the 'check' pulses may be possible if the temperature is relatively stable. It may be possible to use information on the duration between the (n−1)th and nth pulses to determine how long it will be until the (n+1)th pulse is fired, e.g. a Markov model of the gap between pulses. Including such a Markov model in the "boiler operation model" may improve the accuracy of the boiler model.

The model could be improved further still by measuring the time between pulses and using this to alter the gas consumption estimation. For example, a two minute boiler firing that is followed by another 2 minute boiler firing, with a gap of 5 minutes in between may use a different amount of energy than when the gap between the firings is doubled/halved/etc. Thus, by sequences of pulses may have different characteristics depending on the time between the pulses. The "boiler operation model" could be improved by including within the table (e.g. Table 1) information on sequences of pulses (e.g. 2 min firing+5 min gap+2 min firing=x kWh, 2 min firing+5 min gap+3 min firing=y kWh, etc).

Figure 4:
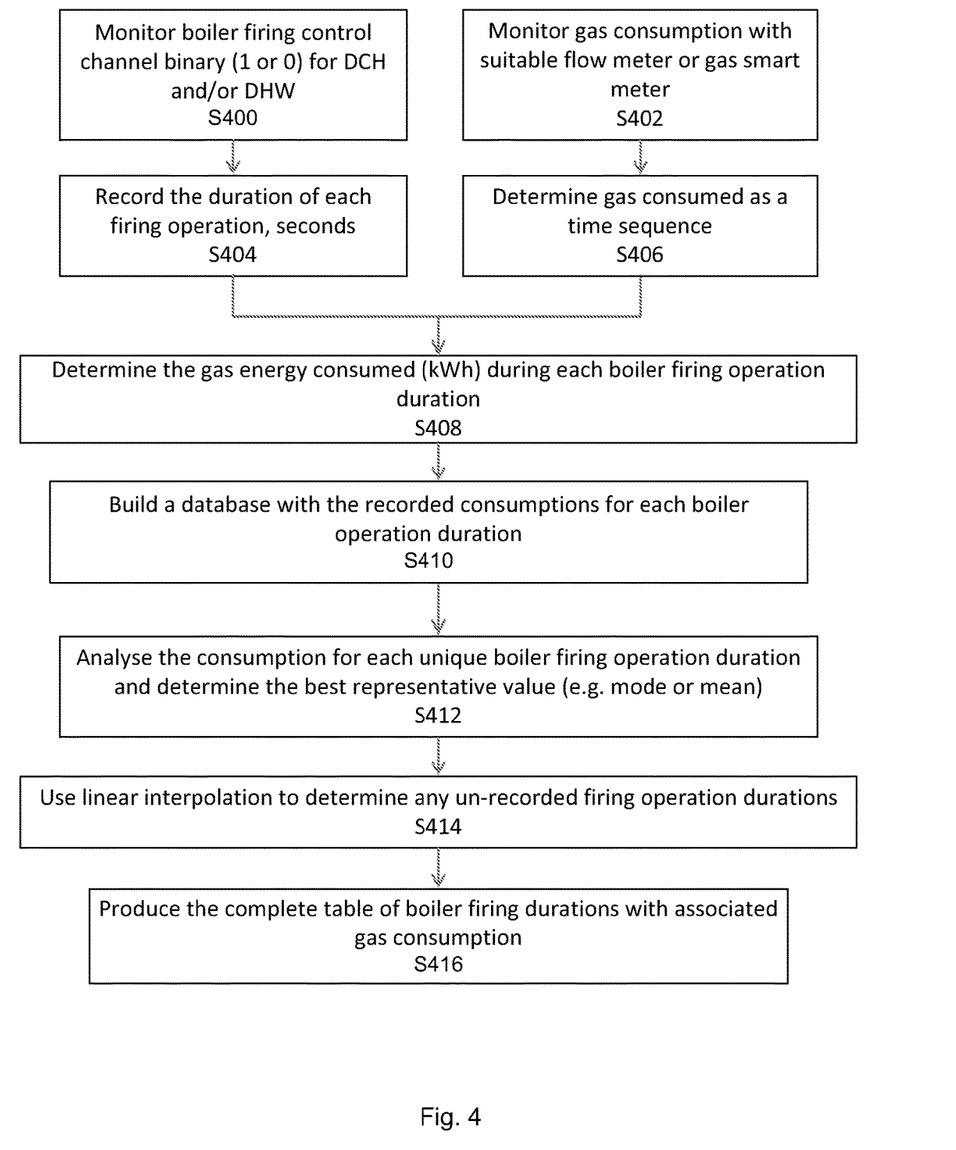
FIG. 4 shows a flowchart of the steps in developing a boiler operation model for a standard boiler.
Figure 5:
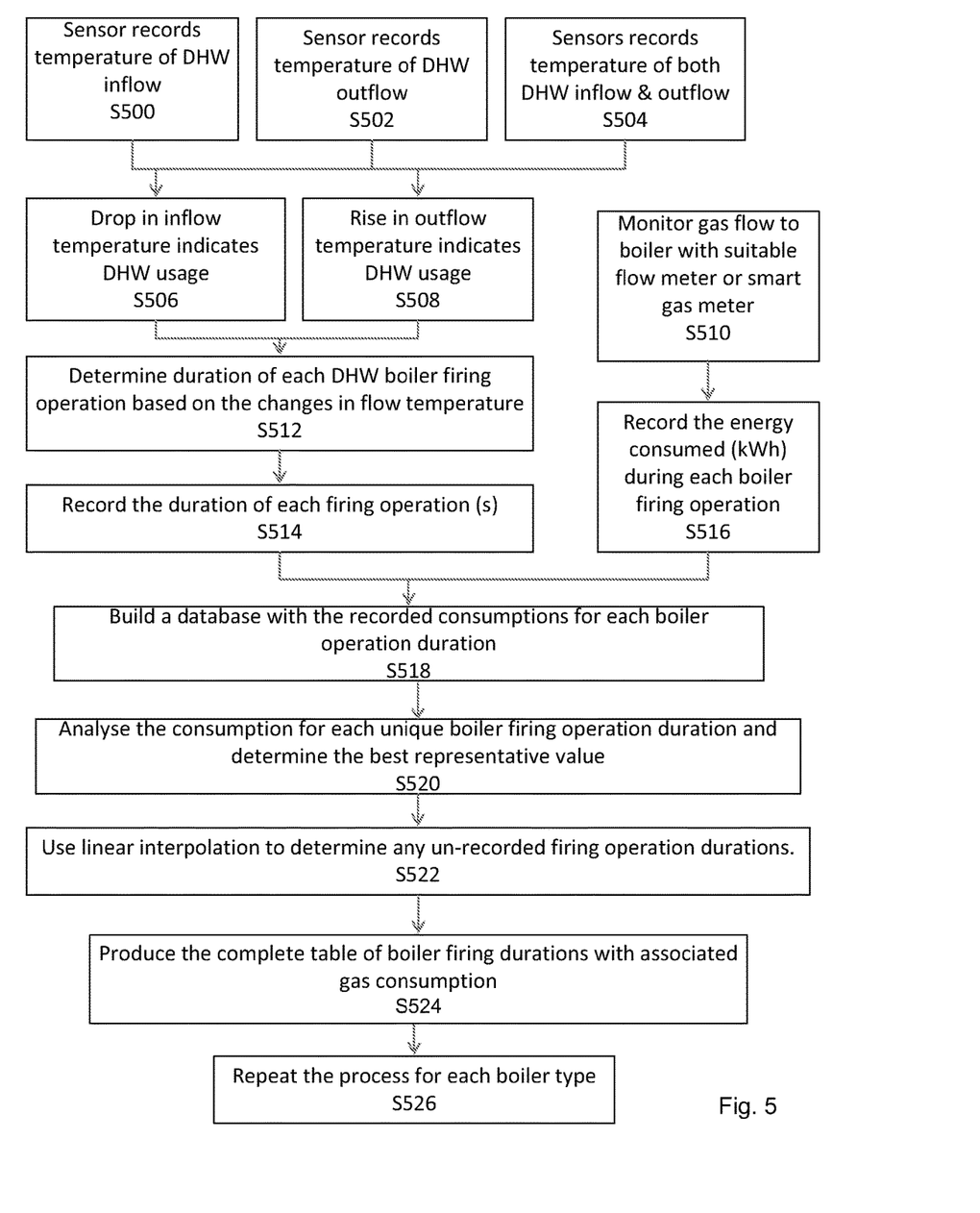
FIG. 5 shows a flowchart of the steps in developing a boiler operation model for a combi boiler.

FIGS. 4 and 5 show the steps in the method used to develop a "boiler operation model" for two general types of boiler. Turning first to FIG. 4, this shows a model for a standard boiler. The first step S400 is to monitor the boiler firing control channel to determine if the boiler is on or off. If there are separate channels for DCH and DHW then each is channel is monitored separately. If it is determined that the boiler has turned on, then the next step S404 is to monitor how long the boiler is on for i.e. to record the duration of each firing operation (in seconds). Simultaneously, step S402 involves monitoring the actual gas consumed by the boiler during each boiler firing. This may be achieved using a suitable flow meter or smart gas meter. Step S406 involves determining how much gas was used in each period when the boiler is turned on.

The data from steps S400-S406 is combined in step S408 to determine the gas energy consumed (in kWh) during each boiler firing duration. An example of the collated data is shown in Table 1. This allows a database to be built which records the measured gas consumption against the duration the boiler was fired (step S410). Generally, data for steps S400 to S408 is collected from actual domestic boilers over a period of several weeks to several months. The data is then analysed to determine the typical gas consumption for each boiler firing duration (e.g. 2 minutes, 4 minutes, 6 minutes, etc). The analysis may involve taking an average (e.g. mode or mean) of the measured gas consumption for each firing duration (step S412), in order to determine the best representative value of the gas consumption for each individual firing duration. As the boiler may not have fired for all possible lengths of time, linear interpolation can be used to determine the gas consumption for any firing durations for which no data has been collected (step S414). Finally, a table of boiler firing durations and the associated gas consumption is produced (step S416), which provides the "boiler operation model" for a particular make/model/type of boiler. Steps S400 to S416 are repeated for different models of standard boiler in order to generate a "boiler operation model" for each make/model of boiler. This is necessary for the accuracy of the modeled gas consumption since the specifications, efficiencies etc may vary between makes of boiler.

As mentioned above, if there are separate channels for DCH and DHW within the boiler, then each is channel is monitored separately and steps S408 to S416 are performed for each channel separately. Thus, two "boiler operation models" are produced for such boilers, one for DCH and one for DHW.

FIG. 5 illustrates the steps in the method used to develop a "boiler operation model" for a combination ('combi') boiler. As mentioned earlier, in a combi boiler the controller may only be able to log the DCH ON command, as DHW may be performed automatically on-demand by the boiler. Thus, it is necessary for example to use a temperature sensor on the DHW outflow pipe of the boiler to determine if the combi boiler is being used to heat water (DHW) or for DCH only. Additionally or alternatively, a single temperature sensor on the DHW inflow pipe may be used to ascertain if the combi boiler is heating water, because drawing water from the tap results in a pressure change that causes water to be drawn in through the inflow pipe (and, more interestingly, the opening a tap and causing water to flow automatically triggers the combi boiler to fire and heat the water without any ON command being issued (and hence not being recordable)). The ground water drawn into the inflow pipe will be at a much lower temperature than the water already in the pipe (which is located inside a house). Thus, a decrease in temperature on the DHW inflow pipe indicates water is being used and heated by the combi boiler.

The "boiler operation model" illustrated in FIG. 5 is developed using either the DHW inflow pipe temperature (S500) or the DHW outflow pipe temperature (i.e. water that has been heated, S502), or both the DHW inflow and outflow temperatures (S504). If steps S500 or S504 are performed (i.e. inflow temperature measured), then as described above, a drop in inflow temperature indicates that the boiler is firing for DHW (S506). Alternatively, if steps S502 or S504 are performed (i.e. outflow temperature measured), then an increase in outflow temperature indicates water has been heated for DHW (S508). Thus, one or more temperature measurements of the DHW pipes allows the combi boiler firings to be separated into DCH and/or DHW usage. (As briefly mentioned above, combi boiler firings for DCH are known because the DCH ON command can be logged.)

Once a change in temperature has been measured at steps S506 and/or S508, the next step S512 is to determine the duration of each firing for DHW by measuring changes in the flow temperature. Once a steady temperature is reached, it can be assumed that the water is no longer being heated so that the boiler may no longer fire for DHW. The duration of the firing and/or how long the temperature was measured as changing is recorded in step S514. (Alternatively, in other embodiments, when the temperature reaches a steady state the boiler may still be firing—producing constant hot water/intake of constant cold water, in which case the end time could be determined by a the start of a return to the original temperature). Simultaneously, step S510 involves monitoring the actual gas consumed by the boiler during each boiler firing. This may be achieved using a suitable flow meter or smart gas meter. Step S516 involves determining how much gas was used in each period when the boiler is determined to be firing for DHW usage. Steps S518 to S524 are substantially the same as steps S408 to S416 in FIG. 4, which are described above. As also discussed with reference to FIG. 4, it is necessary to repeat the process for each make/model of boiler in order to generate a "boiler operation model" for each specification of combi boiler (step S526).

Figure 6:
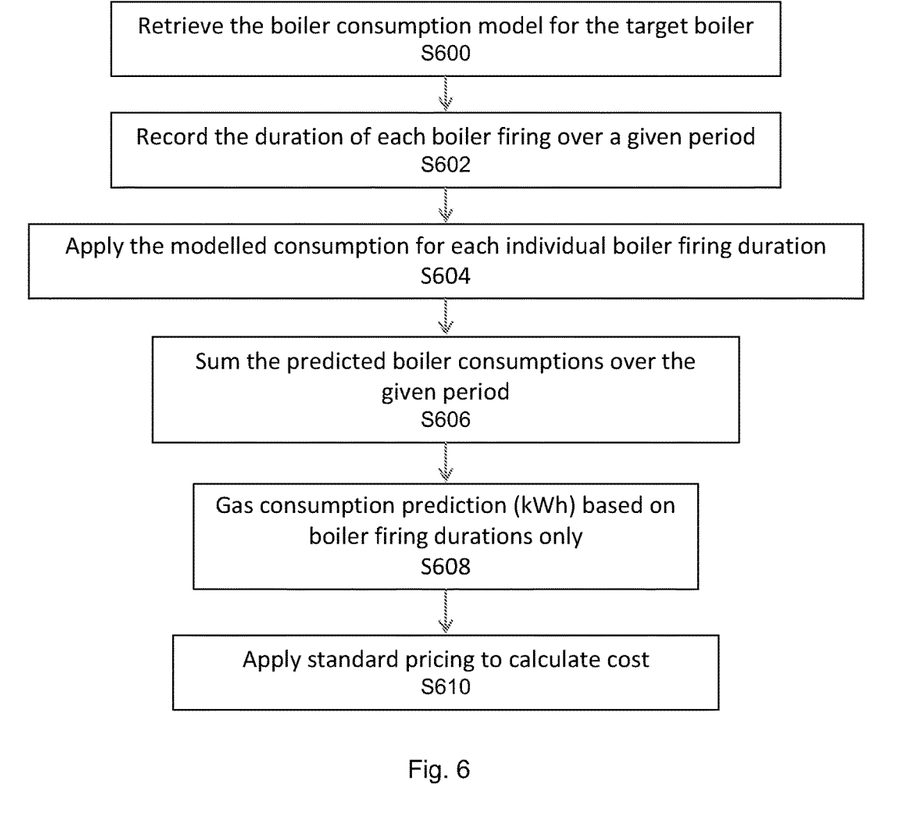
FIG. 6 shows a flowchart of the steps in applying the boiler operation model of FIG. 4 or 5 to predict energy consumption from gas usage.

Turning now to FIG. 6, this shows the steps in the method of applying the "boiler operation model" to estimate gas consumption usage and the associated cost for a particular period. The first step S600 involves retrieving the "boiler operation model" for the particular boiler. Practically, this may involve a domestic user either entering their boiler make/model into the system and the system retrieving the corresponding "boiler operation model" (or the closest one to that particular boiler make/model), or the user selecting from a list of boiler makes/models in the system. The next step S602 is to record boiler firing durations. This step may continue for a fixed period e.g. a particular number of days/weeks/months either manually entered into the system by the user or selected from a set of options. Once all such data has been collected, the gas consumption is estimated by applying the "boiler operation model" to the data (S604) and then summing all of the estimated values over the period over which data was collected (S606). Referring to Table 1 as an example only, if the system recorded the boiler firing for two minutes and then for a period of 10 minutes in the data collection period, then applying the "boiler operation model" of Table 1 would result in an estimated gas consumption of 2.6 kWh. Thus, the result is a total estimated gas consumption based on boiler firing durations (S608). The estimate can be used to calculate the cost for the gas consumption by applying standard pricing models (e.g. x pence per kWh for the first A kwH, and y pence per kWh for any usage above A).

Figure 7:
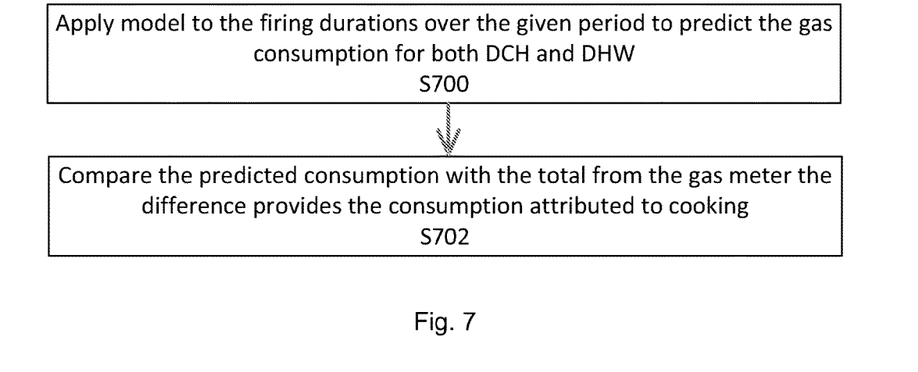
FIG. 7 shows a flowchart of the steps in applying the boiler operation model of FIG. 4 or 5 and data obtained from a smart meter to estimate cooking contribution to overall gas usage.

FIG. 7 illustrates how a "boiler operation model" may be used to determine how much of the gas consumption is attributable to cooking (which is generally low compared to DCH and DHW). After performing for example, the steps shown in FIG. 6 to ascertain the gas consumption estimate (S700), the system or a user themselves can be used to compare the estimate with the total gas used as measured by a standard domestic gas meter (or smart meter) (step S702). The difference between the estimated value and the actual gas used may provide an indication of the gas used for cooking. However, the accuracy of step S702 is dependent on the accuracy of the "boiler operation model" itself.

Figure 8:
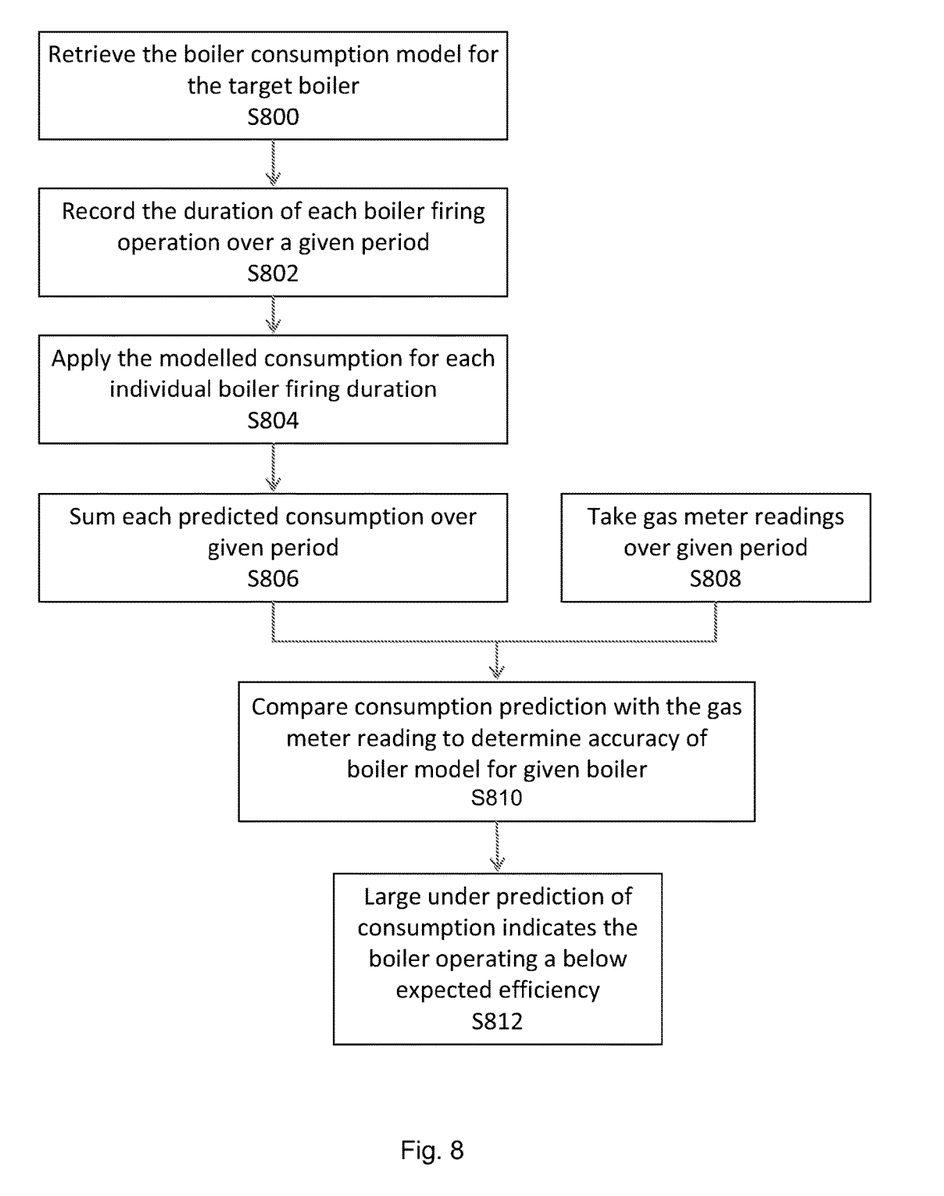
FIG. 8 shows a flowchart of the steps in estimating the efficiency of a boiler based on smart meter data.

FIG. 8 shows how the "boiler operation model" may be used in combination with data obtained from a smart gas meter to estimate the efficiency of a boiler. Steps S800 to S806 are substantially the same as steps S600 to S606 in FIG. 6 described above. In parallel to these steps, gas meter readings are obtained from a standard domestic gas meter or a smart gas meter covering the same period as that for step S802. Both the meter readings and the estimated gas consumption are fed into the system at step S810 in order to allow a comparison between the two values to be made. A difference between the actual gas consumed and the estimated value can indicate a number of issues. For example, if there is a small difference between the estimated and the actual usage that is above the overall accuracy of the particular "boiler operation model" used, then the difference may be attributable to gas that was used neither for DCH or DHW (e.g. for cooking, as described above). If for instance, the difference is greater, then the data can be used to determine the accuracy of the particular "boiler operation model". This feedback may be useful to develop the model further and increase the accuracy. It may for example, indicate that taking account of boiler firing modulation or the time between firing pulses is necessary to improve the accuracy, as discussed above. A large/substantial difference between the estimated usage and actual usage may indicate that the user entered the wrong boiler make/model into the system such that the wrong "boiler operation model" was applied to perform the estimation, or in the case that their boiler make/model was not recognized by the system, that the system needs to choose and apply a different "boiler operation model". Alternatively, a large under prediction of the gas consumption may indicate that the boiler is operating below an expected efficiency (as ascertained from either the data collected when building the "boiler operation model" or from information available on the boiler specification).

The invention further provides processor control code to implement the above-described system and control procedures, for example the boiler operating model, on an embedded processor. The code may be provided on a carrier such as a disk, CD- or DVD-ROM, programmed memory such as read-only memory (Firmware), or on a data carrier such as an optical or electrical signal carrier. Code (and/or data) to implement embodiments of the invention may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog (Trade Mark) or VHDL (Very high speed integrated circuit Hardware Description Language). As the skilled person will appreciate such code and/or data may be distributed between a plurality of coupled components in communication with one another.

No doubt many other effective alternatives will occur to the skilled person. It will be understood that the invention is not limited to the described embodiments and encompasses modifications apparent to those skilled in the art lying within the spirit and scope of the claims appended hereto.

The invention claimed is:

1. A system for estimating fuel consumption of a boiler in a building, the system comprising a processor configured to:
   monitor a control signal, comprising a time series of commands provided from an external heating control unit to the boiler, the control signal for switching water heating and/or space heating on and off,
   determine at least one ON time of the boiler based on the time series of commands comprised in the monitored control signal,
   determine a type of fuel consuming activity based on at least one of:
      a temperature sensor,
      the monitored control signal, and
      one or more operating characteristics of the boiler, and
   determine an estimated fuel consumption of the boiler based at least on the determined type of fuel consuming activity, the at least one ON time of the boiler, and a set of boiler fuel consumption data for mapping said at least one ON time to an estimated fuel consumption.

2. The system of claim 1, further configured to perform said estimating based on at least one temperature of the building, wherein said at least one temperature comprises at least one of: an internal temperature of the building and an external temperature of the building.

3. The system of claim 1, wherein a first said control signal is to activate water heating and a second said control signal is to activate space heating, the system configured to monitor the first control signal to determine said ON time and to monitor the second control signal to determine said ON time, the system comprising a first said boiler operating model for water heating and second said boiler operating model for space heating, the system configured to apply the first and second models to thereby perform at least one said fuel consumption estimation.

4. The system of claim 1, wherein the boiler is a gas boiler and at least one said control signal is for controlling a gas flow valve on and off.

5. The system of claim 1, further comprising a current measuring device coupled between the boiler and an electricity supply for monitoring electricity usage of the boiler, the system configured to determine said ON time on the basis of said electricity usage monitoring by the current measuring device.

6. The system of claim 1, wherein the boiler is a combination boiler, the system comprising at least one temperature sensor on a water inflow pipe and/or water outflow pipe of the boiler, the system configured to detect temperature change on the basis of at least one sensed output of the at least one temperature sensor to thereby provide said ON time.

7. The system of claim 1, wherein the system is operable to perform said estimating on the basis of, any one or more of:
- a time series of On/Off commands to the boiler for controlling heating of water for a central heating system;
- a time series of On/Off commands to the boiler for controlling heating of water for supplying hot water to taps;
- a time series of indications of boiler electricity consumption;
- a time series of at least one room temperature;
- a time series of at least one external temperature;
- an indication of the type of the boiler, e.g., maximum power, condensing/non-condensing, make and/or model;
- at least one heating system characteristic;
- at least one temperature on an output pipe of the boiler; and
- an indication of electricity consumption of the boiler.

8. The system of claim 1, configured to estimate said fuel consumption without receiving input from a measuring device arranged to measure flow rate of said fuel.

9. The system of claim 1, wherein the fuel is gas or oil.

10. The system of claim 1, wherein the set of boiler fuel consumption data maps a plurality of distinct boiler firing durations to associated fuel consumption values.

11. The system of claim 1, further comprising:
determining the device model or type of boiler; and
looking up the set of boiler fuel consumption data associated with the device model and/or type of boiler from a plurality of sets of boiler fuel consumption data each corresponding to a particular device model and/or type of boiler.

12. A method of estimating fuel consumption in a building, the method comprising the steps performed by a processor of:
monitoring a control signal, comprising a time series of commands provided from an external heating control unit to a boiler, wherein the control signal is for switching water heating and/or space heating on and off;
determining at least one ON time of the boiler based on the time series of commands comprised in the monitored control signal,
determining a type of fuel consuming activity based on at least one of:
a temperature sensor,
the monitored control signal, and
one or more operating characteristics of the boiler, and
determining an estimated fuel consumption of the boiler based at least on the determined type of fuel consuming activity, the at least one ON time of the boiler, and a set of boiler fuel consumption data for mapping said at least one ON time to an estimated fuel consumption.

13. The method of claim 12, comprising performing said estimating based on at least one temperature of the building, wherein said at least one temperature comprises at least one of: an internal temperature of the building and an external temperature of the building.

14. The method of claim 12, wherein determining a type of fuel consuming activity is based at least on a duration of said control signal, and wherein said type is water heating or space heating.

15. The method of claim 14, comprising using a model to determine estimated fuel consumption, wherein a function of the model is determined on the basis of boiler specification data.

16. The method of claim 15, comprising performing the fuel consumption estimating based on a duration of at least one time interval between instances of the boiler being on, wherein the boiler is off in each said time interval.

17. The method of claim 16, comprising performing said estimation on the basis of any one or more of:
- a time series of On/Off commands to the boiler for controlling heating of water for a central heating system;
- a time series of On/Off commands to the boiler for controlling heating of water for supplying hot water to taps;
- a time series of indications of boiler electricity consumption;
- a time series of at least one room temperature;
- a time series of at least one external temperature;
- an indication of the type of the boiler;
- at least one heating system characteristic;
- at least one temperature on an output pipe of the boiler; and
- an indication of electricity consumption of the boiler.

18. The method of claim 12, comprising estimating said fuel consumption without receiving input from a measuring device arranged to measure flow rate of said fuel.

19. The method of claim 12, wherein the fuel is gas or oil.

20. The method of claim 12, comprising measuring fuel consumption and estimating efficiency of the boiler based on the measured fuel consumption and the estimated fuel consumption.

21. The method of claim 20, comprising combining a result of said fuel consumption estimation with an estimate of consumption of said fuel for cooking.

22. The method of claim 20, comprising disaggregation of the estimated fuel consumption into component contributions, the disaggregation determining water heating fuel consumption and/or cooking fuel consumption by subtracting a space heating contribution from an estimated total consumption, and/or determining water heating fuel consumption and/or space heating fuel consumption based on measurements of internal temperature of the building during the duration of the estimated fuel consumption, the fuel being gas.

23. A system for estimating fuel consumption of a furnace in a building, the system comprising a processor configured to perform said estimating on the basis of at least one ON time of a fan of the furnace, the processor configured to:
monitor at least one control signal, comprising a time series of commands provided from an external heating control unit to the furnace to determine said ON time, wherein the control signal is for switching air heating on and off;
determine a type of fuel consuming activity based on at least one of:
a temperature sensor,
the monitored control signal, and
one or more operating characteristics of the furnace, and
determine an estimated fuel consumption of the furnace based at least on the determined type of fuel consuming activity, the at least one ON time, and a set of furnace fuel consumption data for mapping said at least one ON time to an estimated fuel consumption.

24. A system for estimating fuel consumption of a boiler in a building, the system comprising:
a current measuring device coupled between the boiler and an electricity supply for monitoring electricity usage of the boiler, and
a processor configured to:
determine an ON time of the boiler on the basis of said electricity usage monitoring by the current measuring device, and
determine an estimated fuel consumption of the boiler based at least on the at least one ON time of the boiler, and a set of boiler fuel consumption data for mapping said at least one ON time to an estimated fuel consumption.

* * * * *